(12) United States Patent
Garbarino

(10) Patent No.: US 11,031,037 B1
(45) Date of Patent: Jun. 8, 2021

(54) SYSTEM FOR DISK-TO-DISK ACCESS FOR REDUCED-HEAD DATA STORAGE DEVICE

(71) Applicant: Western Digital Technologies, Inc., San Jose, CA (US)

(72) Inventor: Jon M. Garbarino, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/900,764

(22) Filed: Jun. 12, 2020

(51) Int. Cl.
| | | |
|---|---|---|
| *G11B 5/48* | (2006.01) | |
| *G11B 5/54* | (2006.01) | |
| *G11B 21/22* | (2006.01) | |
| *G11B 17/02* | (2006.01) | |
| *G11B 5/55* | (2006.01) | |
| *G11B 33/04* | (2006.01) | |

(52) U.S. Cl.
CPC .......... *G11B 17/021* (2013.01); *G11B 5/4813* (2013.01); *G11B 5/54* (2013.01); *G11B 5/5578* (2013.01); *G11B 21/22* (2013.01); *G11B 33/0444* (2013.01)

(58) Field of Classification Search
None
See application file for complete search history.

(56) References Cited

U.S. PATENT DOCUMENTS

| | | | |
|---|---|---|---|
| 3,134,097 A | 5/1964 | Stevens et al. | |
| 3,172,082 A | 3/1965 | Dirks | |
| 3,503,060 A | 3/1970 | Goddard et al. | |
| 3,703,713 A * | 11/1972 | Pohm et al. | G11B 17/021 360/98.02 |
| 3,975,769 A * | 8/1976 | King | G11B 5/5521 360/98.02 |
| 4,092,681 A * | 5/1978 | Dix et al. | G11B 5/5521 360/98.02 |
| 4,566,087 A | 1/1986 | Kraft | |
| 5,930,549 A | 7/1999 | Kim et al. | |
| 7,986,491 B2 | 7/2011 | Albrecht et al. | |
| 8,112,580 B2 | 2/2012 | Bandic et al. | |
| 8,208,215 B2 | 6/2012 | Molaro et al. | |
| 8,824,094 B1 | 9/2014 | Furlong et al. | |
| 8,958,172 B1 | 2/2015 | Hansen | |
| 8,958,173 B1 | 2/2015 | Hirano et al. | |
| 9,025,277 B1 | 5/2015 | Hirano | |
| 9,183,862 B1 | 11/2015 | Shah et al. | |
| 9,218,833 B1 | 12/2015 | Shah et al. | |

(Continued)

OTHER PUBLICATIONS

International Business Machines Corporation, IBM Customer Engineering Manual of Instruction, RAMAC 305, copyright 1958, 1959 by International Business Machines Corporation, 253 pages.

*Primary Examiner* — Craig A. Renner
(74) *Attorney, Agent, or Firm* — John D. Henkhaus

(57) ABSTRACT

An approach to a reduced-head hard disk drive (HDD) involves an elevator platform assembly for moving an actuator assembly, one or more bearing assemblies, and a load/unload ramp along one or more support posts to provide a head slider access to at least two different recording disk media of a disk stack. The HDD may include a piezoelectric actuator locking mechanism integral to one of the bearing assemblies, such that actuation of the actuator either locks or unlocks the locking mechanism relative to a corresponding support post. When unlocked, the elevator platform assembly can be translated along the length of the disk stack via a motor.

20 Claims, 9 Drawing Sheets

(56) References Cited

U.S. PATENT DOCUMENTS

| | | |
|---|---|---|
| 9,552,835 B1 | 1/2017 | Tamayo et al. |
| 9,704,521 B1 | 7/2017 | Shah et al. |
| 10,269,380 B1 | 4/2019 | Sun et al. |
| 2004/0109255 A1 | 6/2004 | Walz |
| 2008/0055773 A1 | 3/2008 | Nigam |
| 2010/0091408 A1 | 4/2010 | Albrecht et al. |
| 2011/0080675 A1 | 4/2011 | Boutaghou et al. |
| 2015/0070789 A1 | 3/2015 | Kugler et al. |
| 2015/0070798 A1 | 3/2015 | Shiraishi et al. |
| 2017/0108052 A1 | 4/2017 | Littlefield et al. |
| 2019/0333533 A1 | 10/2019 | Mendonsa et al. |
| 2020/0227077 A1* | 7/2020 | Sukla et al. ......... G11B 5/4813 |

* cited by examiner

US 11,031,037 B1

SYSTEM FOR DISK-TO-DISK ACCESS FOR REDUCED-HEAD DATA STORAGE DEVICE

FIELD OF EMBODIMENTS

Embodiments of the invention may relate generally to a reduced-head hard disk drive having an actuator elevator mechanism to provide read-write access to the recording disks and particularly to approaches to a platform-type elevator mechanism.

BACKGROUND

There is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra large diameter disks and HDDs having an extra tall form factor, with both requiring large capital investment due to unique components and assembly processes, low value proposition in the context of cost savings, and barriers to adoption in the marketplace due to uniquely large form factors, for example.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DESCRIPTION

Approaches to a multi-disk hard disk drive having a platform-type elevator assembly for moving an actuator relative to the disks are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a multi-disk, reduced read-write head, digital data storage device (DSD) such as a hard disk drive (HDD). Thus, in accordance with an embodiment, a plan view illustrating a conventional HDD 100 is shown in FIG. 1 to aid in describing how a conventional HDD typically functions.

Figure 1:
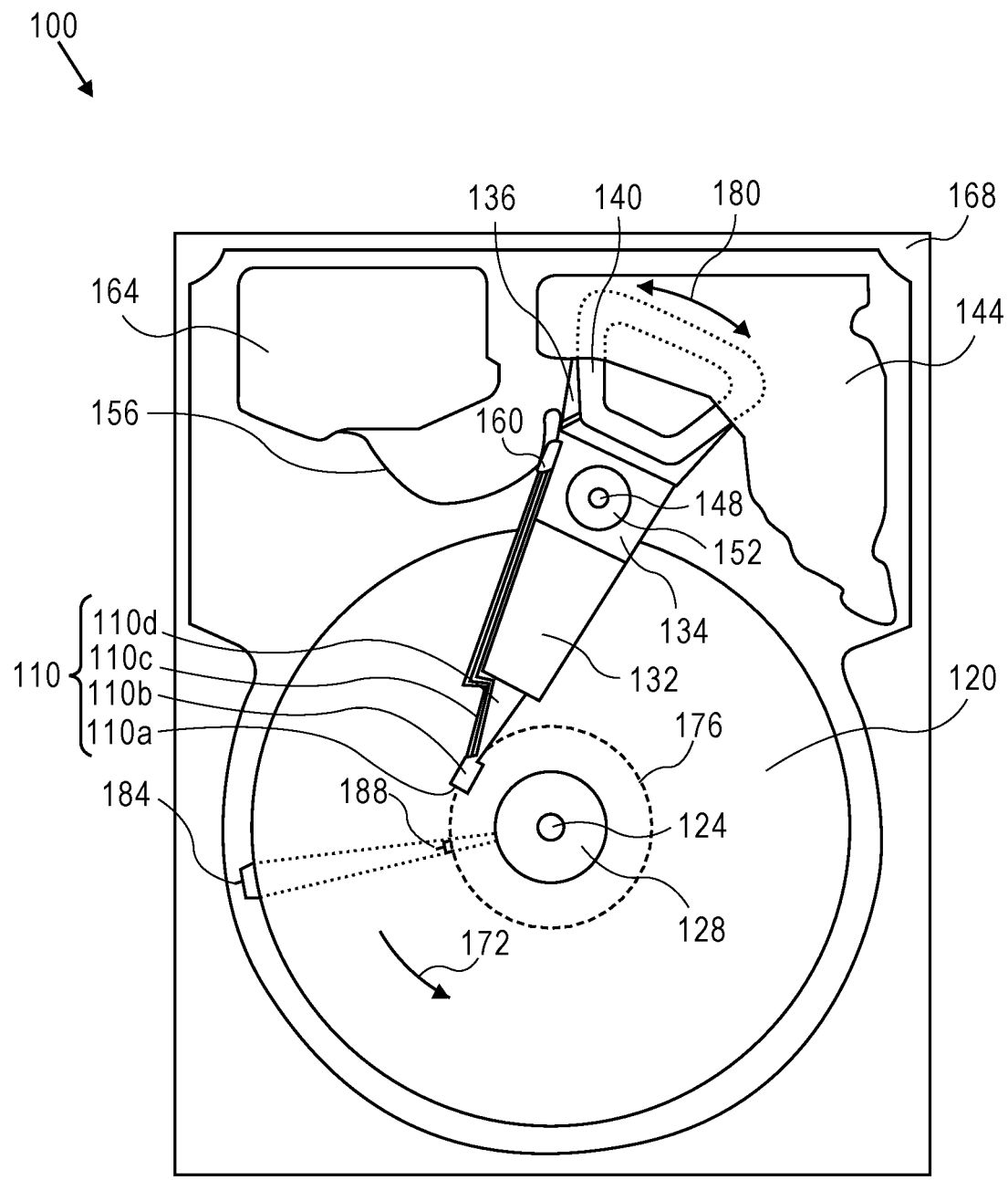
FIG. 1 is a plan view illustrating a hard disk drive, according to an embodiment.

FIG. 1 is a plan view illustrating a hard disk drive, according to an embodiment. Components of a hard disk drive (HDD) 100 include a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

INTRODUCTION

Terminology

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that there is an increasing need for cost effective "active" archival storage (also referred to as "cold storage"), preferably having a conventional form factor and utilizing many standard components. One approach involves a standard hard disk drive (HDD) form factor (e.g., a 3.5" form factor) and largely common HDD architecture, with n disks in one rotating disk stack, but containing fewer than 2n read-write heads, according to embodiments. Such a storage device may utilize an articulation mechanism that can move the heads to mate with the different disk surfaces (for a non-limiting example, only 2 heads but 5+ disks for an air drive or 8+ disks for a He or other lighter-than-air gas drive), where the primary cost savings may come from eliminating the vast majority of the heads in the drive. Generally, the term "reduced-head HDD" is used herein to refer to an HDD in which the number of read-write heads is less than the number of magnetic-recording disk media surfaces.

Platform-Based Actuator Elevator

For a reduced-head HDD, a very thin structure (e.g., the read-write head stack assembly, or "HSA") needs to be moved (e.g., translated, or elevated) while keeping perpendicular to the axis on which it is moving. Such an elevator subsystem for a reduced-head HDD may involve a movable platform used for housing an actuator assembly, e.g., a conventional HSA comprising one or more actuator arm assemblies each with a corresponding HGA housing a corresponding read-write head (such as read-write head 110a of FIG. 1) and a load/unload ramp assembly, for collectively translating or elevating such sub-components.

Figure 2:
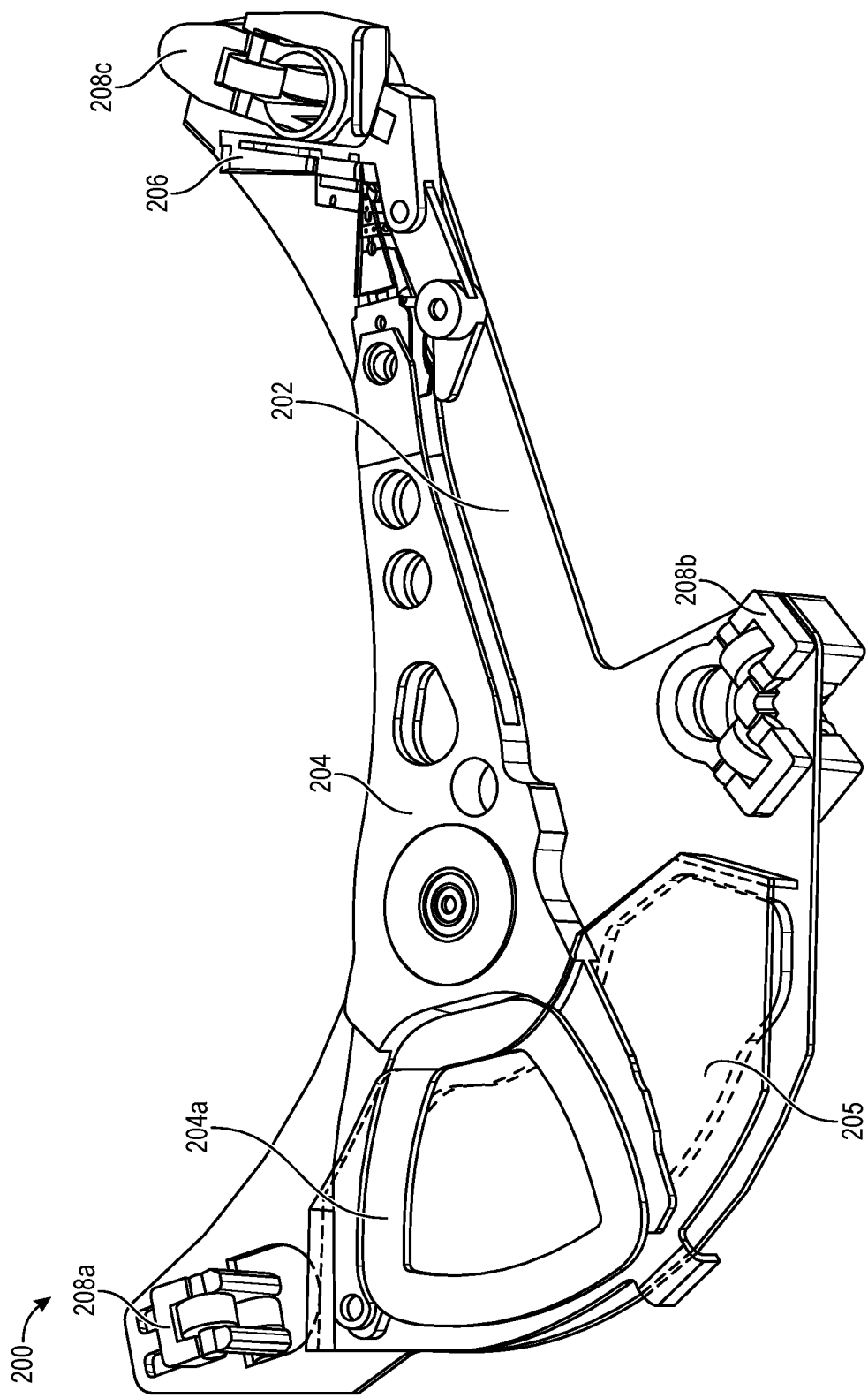
FIG. 2 is a perspective view illustrating an elevator assembly, according to an embodiment.

FIG. 2 is a perspective view illustrating an elevator assembly, according to an embodiment. Elevator assembly 200 comprises a platform 202, an actuator assembly 204 including a voice coil motor (VCM) 205 (see, e.g., coil 140, coil support structure or armature 136, and at least one actuator arm 132 of FIG. 1) including a coil 204a, a load/unload (LUL) ramp assembly 206, and at least one bearing assembly 208 (shown here as three bearing assemblies 208a, 208b, 208c). As depicted, a LUL ramp assembly such as LUL ramp assembly 206 that may be implemented with elevator assembly 200 is described in U.S. patent application Ser. No. 16/516,195 (e.g., in reference to FIGS. 4A-4C), entitled "Vertically Translating Load/Unload Mechanism For Cold Storage Data Storage Device", the entire content of which is incorporated by reference in its entirety as if fully set forth herein. Note that the type and form of LUL ramp assembly that may be employed with elevator assembly 200 may vary from implementation to implementation based on needs, and the LUL ramp assembly 206 illustrated here and described in more detail in the referenced application is for example purposes.

Figure 3:
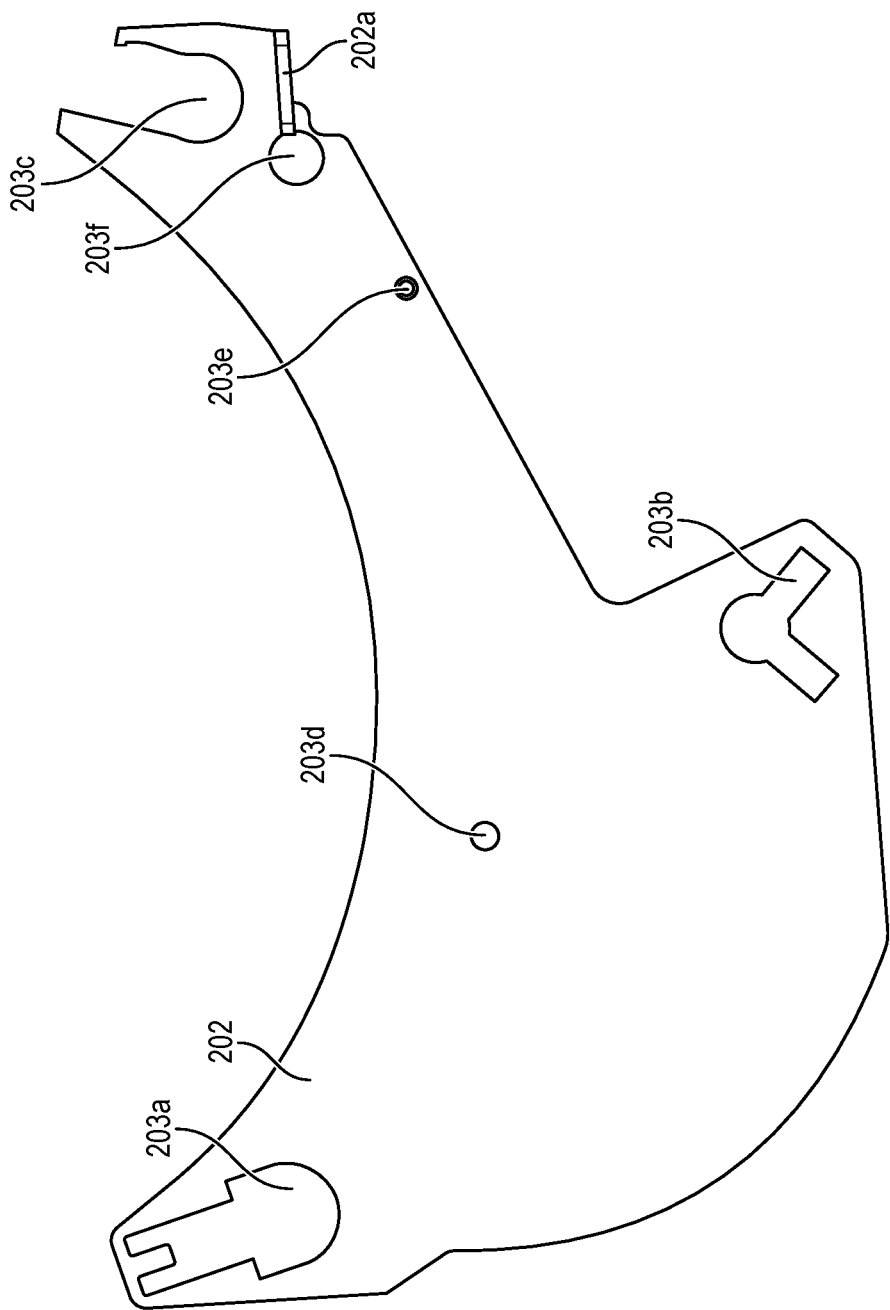
FIG. 3 is a plan view illustrating a platform for the elevator assembly of FIG. 2, according to an embodiment.

FIG. 3 is a plan view illustrating a platform for the elevator assembly of FIG. 2, according to an embodiment. The platform 202 comprises a respective bearing cutout 203a, 203b, 203c from the main plate, for each of the at least one bearing assembly 208a, 208b, 208c (FIG. 2), as well as any other mounting holes (e.g., threaded) that may be needed to mount other sub-components onto the platform 202. The number of mounting holes may vary from implementation to implementation depending on the various sub-components that may be mounted onto the platform 202. Depicted here is a hole 203d for mounting the actuator assembly 204 (FIG. 2), and hole 203e and hole 203f for mounting linkages associated with the rotating LUL ramp assembly 206. Platform 202 further comprises an upward extending tab 202a for magnetic interaction with a magnet of the ramp assembly 206 (FIG. 2). Note that the precise shape of the platform 202 may vary from implementation to implementation based on needs, and the shape of platform 202 illustrated here is for example purposes.

Figure 4:
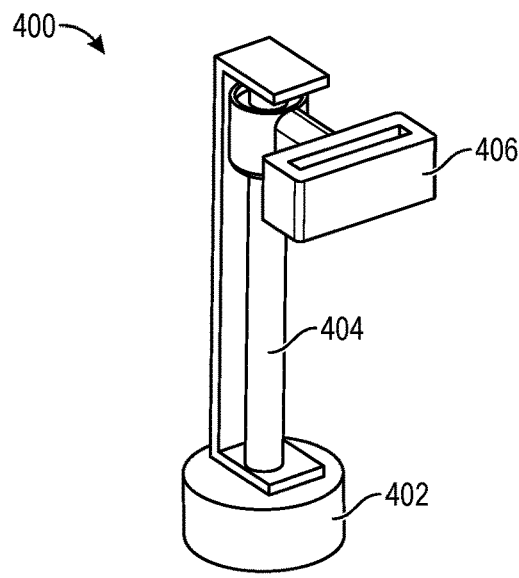
FIG. 4 is a perspective view illustrating a motor for translating the elevator assembly of FIG. 2, according to an embodiment.

FIG. 4 is a perspective view illustrating a motor for translating the elevator assembly of FIG. 2, according to an embodiment. According to an embodiment, motor 400 comprises a stepper motor comprising a motor part 402 which drives/rotates a corresponding shaft 404 (e.g., threaded) on which a platform coupler 406 (e.g., threaded) moves or translates linearly along and in a direction of the axis of the shaft 404, thereby driving the movement or translation of the platform 202 coupled to the platform coupler 406. The manner in which the motor 400 is coupled with the platform 202 via the platform coupler 406 is described elsewhere herein.

Figure 5:
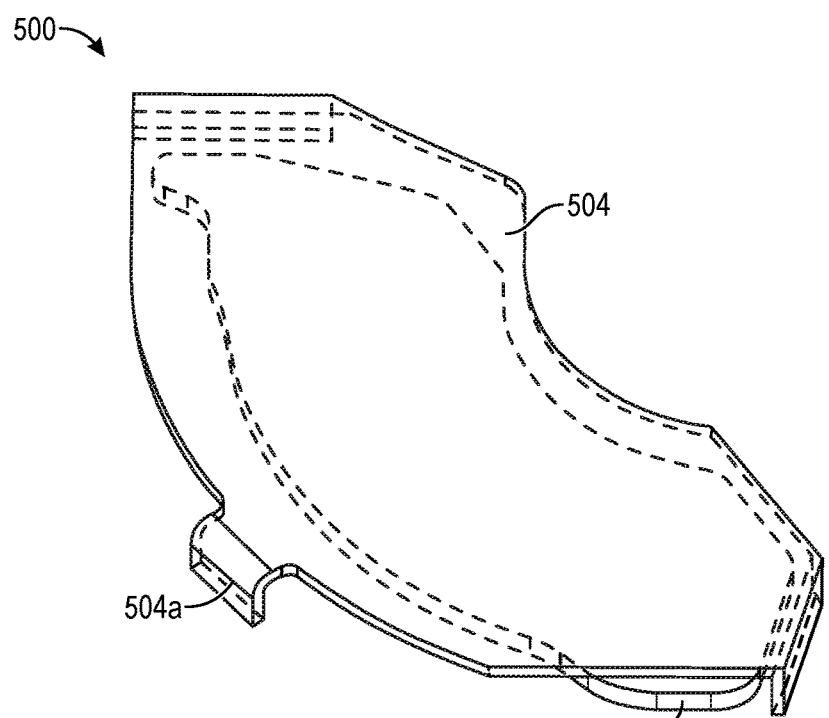
FIG. 5 is a perspective view illustrating voice coil motor sub-components for the elevator assembly of FIG. 2, according to an embodiment.

FIG. 5 is a perspective view illustrating voice coil motor (VCM) sub-components for the elevator assembly of FIG. 2, according to an embodiment. VCM sub-components 500 represent sub-components of the VCM motor 205 (FIG. 2), comprising a voice coil magnet 502 covered by a plate 504, in between which a VCM coil (coil 204a of FIG. 2) is interposed. The magnet 502 and plate 504 of VCM motor 205 generally operate as a typical VCM motor installed in an HDD. The plate 504 further comprises a tab 504a extending from the main portion of the plate 504, for insertion into the platform coupler 406 of the motor 400 (FIG. 4). This coupling of the platform coupler 406 of the motor 400 with the tab 504a of the plate 504 of VCM 205 provides the mechanism for the motor 400 to drive (e.g., translate) the platform 202 up and down in the direction of the axis of the shaft 404 of the motor 400.

Figure 6A:
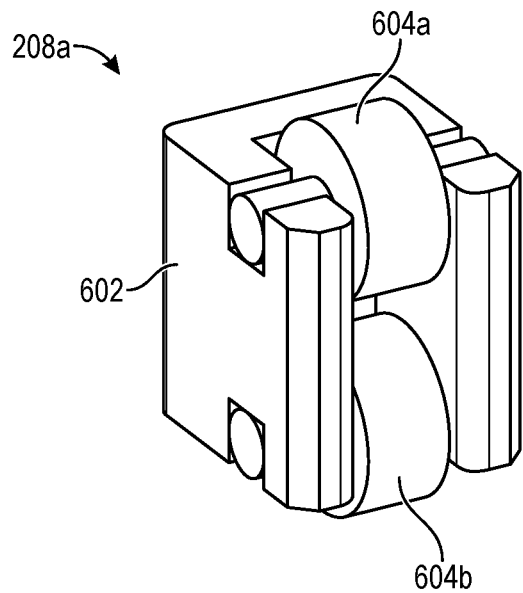
FIG. 6A is a perspective view illustrating a bearing assembly for the elevator assembly of FIG. 2, according to an embodiment.
Figure 6B:
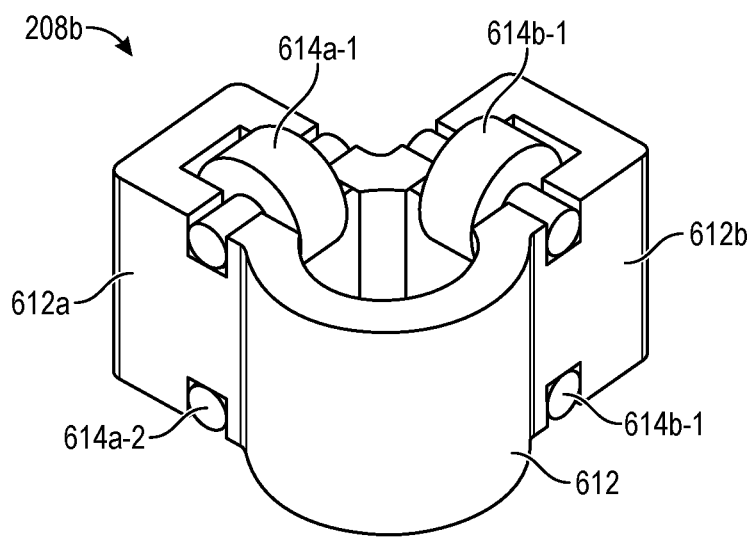
FIG. 6B is a perspective view illustrating another bearing assembly for the elevator assembly of FIG. 2, according to an embodiment.

FIG. 6A is a perspective view illustrating a bearing assembly for the elevator assembly of FIG. 2, according to an embodiment. Bearing assembly 208a comprises a housing 602 configured to house a roller bearing 604a and a roller bearing 604b. According to an embodiment, bearing assembly 208a is configured for positioning within the cutout 203a of the platform 202 (FIG. 3) and for interaction with a corresponding support post (e.g., support post 802a of FIGS. 8A, 8B) to provide bearing functionality for the platform 202 and corresponding mounted sub-components. FIG. 6B is a perspective view illustrating another bearing assembly for the elevator assembly of FIG. 2, according to an embodiment. Bearing assembly 208b comprises a semi-circular housing 612 comprising housing extension 612a and housing extension 612b extending therefrom in perpendicular directions. Housing extension 612a is configured to house roller bearing 614a-1 and roller bearing 614a-2, and housing extension 612b is configured to house a roller bearing 614b-1 and a roller bearing 614b-2. According to an embodiment, bearing assembly 208b is configured for positioning within the cutout 203b of the platform 202 (FIG. 3) and for interaction with a corresponding support post (e.g., support post 802b of FIGS. 8A, 8B) to provide further bearing functionality for the platform 202 and corresponding mounted sub-components.

Figure 6C:
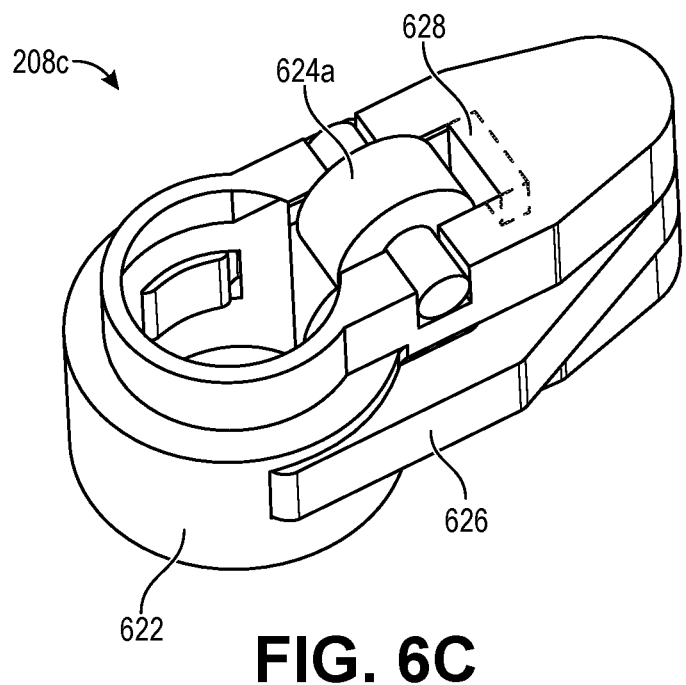
FIG. 6C is a perspective view illustrating a bearing clamp assembly for the elevator assembly of FIG. 2, according to an embodiment.

FIG. 6C is a perspective view illustrating a bearing clamp assembly for the elevator assembly of FIG. 2, according to an embodiment. A bearing assembly such as bearing assembly 208c that may be implemented with elevator assembly 200 is described in U.S. patent application Ser. No. 16/731,740 (e.g., in reference to FIGS. 6A-6D), entitled "Piezo-electric-Based Locking Of Actuator Elevator Mechanism For Cold Storage Data Storage Device", the entire content of which is incorporated by reference in its entirety as if fully set forth herein. Bearing assembly 208c comprises a housing 622 configured to house a roller bearing 624a and another underside roller bearing (not visible). According to an embodiment, bearing assembly 208c is configured for positioning within the cutout 203c of the platform 202 (FIG. 3) and for interaction with a corresponding support post (e.g., support post 802c of FIGS. 8A, 8B) to provide bearing functionality for the platform 202 and corresponding mounted sub-components while facilitating the translation of the bearing assembly 208c and the platform 202. As described in the referenced '740 application (with different reference numbers), a roller bearing clamp assembly such as bearing assembly 208c comprises at least one piezoelectric actuator 628 positioned to open/close a clamp 626 that is activated/deactivated via operation of the actuator 628. The clamp 626 (e.g., stainless steel) is configured to house the piezoelectric actuator 628, and to lock/unlock from a corresponding support post responsive to actuation of the actuator 628. Once the bearing assembly 208c is opened and released from the friction with the corresponding post, the platform 202 is free to translate along the one or more support posts under the driving force of the motor 400 (FIG. 4). While this embodiment is described as unlocked when actuated, thus opening the clamp 626 in which the piezoelectric actuator 628 is "embedded", the clamp 626 and piezoelectric actuator 628 could be reversely configured to be open when at rest with no electricity applied and, therefore, close the clamp 626 when actuated, based on implementation requirements/goals.

Figure 7:
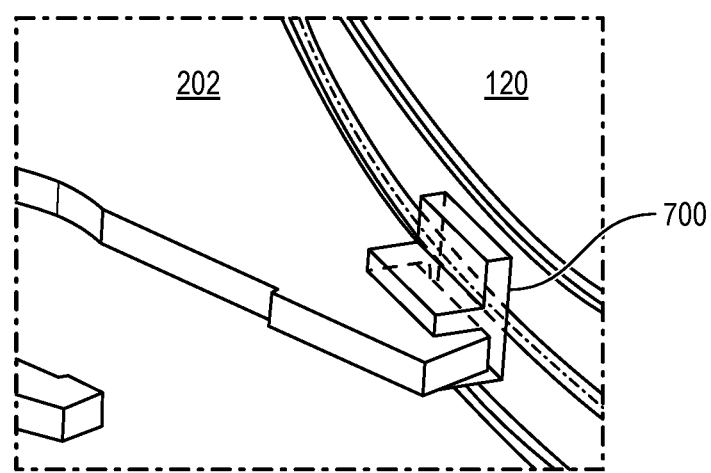
FIG. 7 is a perspective view illustrating a z-height sensor for the elevator assembly of FIG. 2, according to an embodiment.

FIG. 7 is a perspective view illustrating a z-height sensor for the elevator assembly of FIG. 2, according to an embodiment. Sensor 700 is coupled to the platform 202 and configured to sense an adjacent magnetic recording disk (e.g., recording medium 120 of FIG. 1) edge, for position detection. According to an embodiment, an inductive proximity sensor (and associated electronic circuitry) is utilized for sensor 700 and is positioned as close to the disk stack as practically feasible. As such, inductive sensor 700 relies on the principle of electromagnetic induction and may be implemented in the form of one or more coils embedded in a flexible printed circuit (FPC). In one form of inductive sensor 700, a coil (e.g., an inductor, such as in an LCR circuit comprising an inductor, capacitor, and resistor) may be used to generate a varying magnetic field and another coil may be used to detect changes in the magnetic field introduced by a metallic object, such as the nickel-plating covering the edge of disk 120. In another form of inductive sensor 700, a metallic object (such as the nickel-plating covering the edge of disk 120) moving past the coil(s) will alter the inductance in the coil and hence the resonant frequency of the LCR circuit electrically coupled to the electronic circuitry, whereby the change in resonant frequency is detected. The electronic circuitry then converts this change in resonant frequency to a standard DAC (digital-to-analog converter) output, which can be used for servo control of the motor 400. Hence, the change in resonant frequency of the inductive sensor 700, when moving from media to air gap to media, can be detected and, therefore, the positioning of the platform 202 relative to the disk stack can likewise be determined. The type/form of sensing mechanism used may vary from implementation to implementation.

Installation of Elevator Assembly in Hard Disk Drive

Figure 8A:
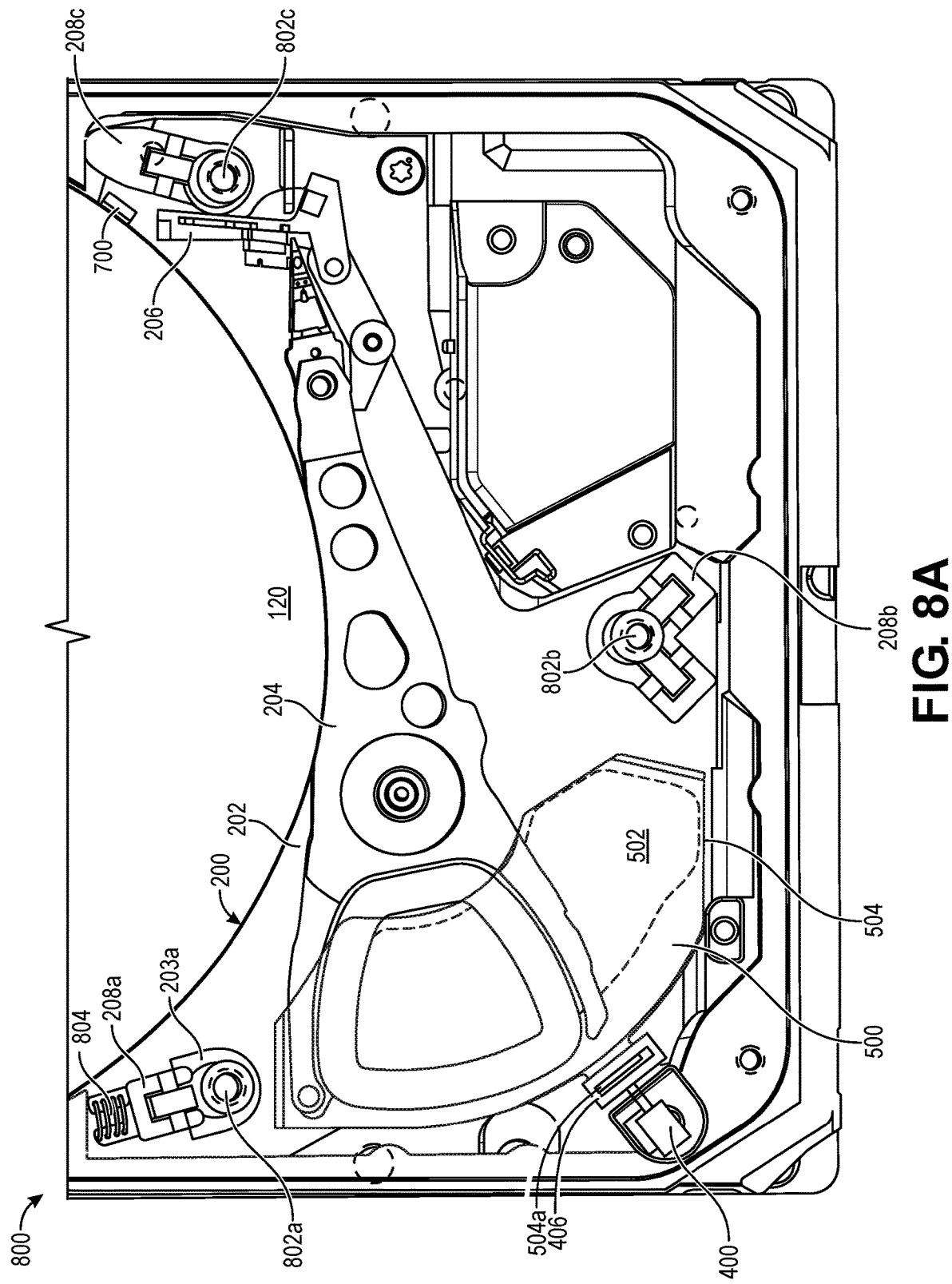
FIG. 8A is a plan view illustrating an installation of the elevator assembly of FIG. 2, according to an embodiment.
Figure 8B:
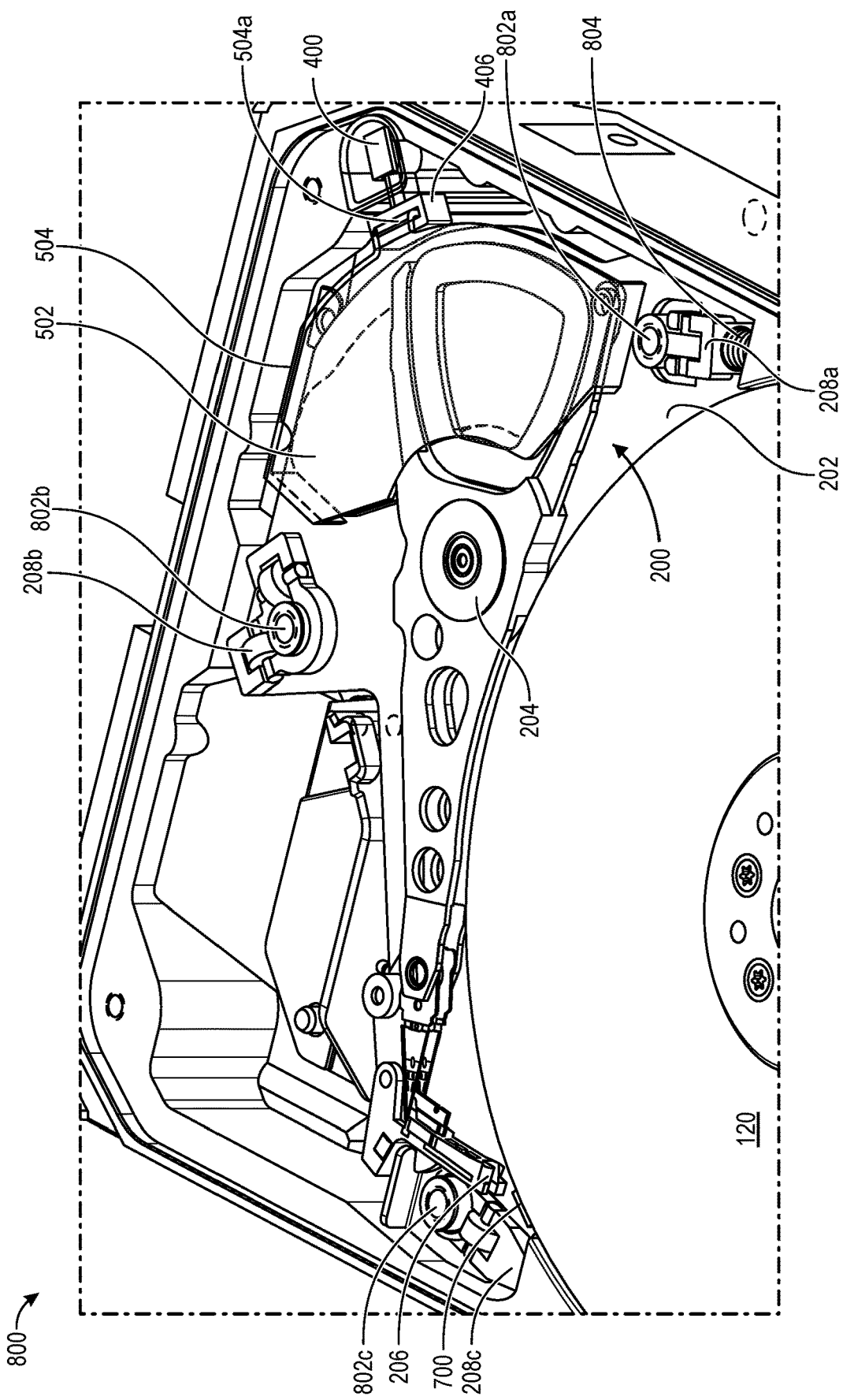
FIG. 8B is a perspective view illustrating the elevator assembly installation of FIG. 8A, according to an embodiment.

FIG. 8A is a plan view illustrating an installation of the elevator assembly of FIG. 2, and FIG. 8B is a perspective view illustrating the elevator assembly installation of FIG. 8A, both according to an embodiment. Collectively FIGS. 8A, 8B depict an installation 800 comprising the elevator assembly 200 (or "elevator platform assembly 200") installed in a reduced-head hard disk drive (HDD). The elevator assembly 200 is mechanically coupled to the motor 400 by way of tab 504a of plate 504 disposed within the coupler 406 of motor 400. The motor 400 drives the translational movement of the elevator assembly 200 up and down (in the context of a horizontally positioned HDD) parallel to the axis of a disk stack including a recording medium 120 (or simply "disk 120") so that the actuator assembly 204 housing read-write heads (such as read-write head 110a of FIG. 1) is enabled to rotate via the VCM (e.g., VCM sub-components 500 and VCM coil 204a) from a parked position on the LUL ramp assembly 206 to reading and writing positions in relation to (e.g., "over") one or more disks 120 of a multiple-disk stack. Note that the location of the motor 400 within the HDD may vary from implementation to implementation, and that the position depicted in FIGS. 8A, 8B is one example.

The elevator assembly 200 is supported by and moves along each of the support posts 802a, 802b, 802c (collectively "802"), each of which is engaged with (e.g., disposed within) one of the respective preloaded (by way of spring 804 engaged with bearing assembly 208a) bearing assemblies 208a, 208b, 208c (collectively "208") configured to provide bearing forces associated with the elevator assembly 200 (particularly, the platform 202) and each respective support post 802a-802c. The elevator assembly 200 can be locked at and unlocked from various positions along the disk stack, such positions detected via the sensor 700 coupled to the edge of the platform 202, by way of one or more bearing assembly including a locking mechanism, which in this installation 800 is the bearing assembly 208c having the clamp 626 (FIG. 6C) actuated/deactuated by the piezoelectric actuator 628 (FIG. 6C). Electrical signals for the various electrical/electronic components, such as the motor 400, the piezoelectric actuator 628, and the sensor 700, may be provided by suitable electrical circuitry, such as by a flexible printed circuit (FPC) and/or flexible cable assembly (FCA). Note that the number of support posts 802 and corresponding bearing assemblies 208 may vary from implementation to implementation, and the use of three with installation 800 is an example.

Method of Accessing Multiple Recording Disks in a Reduced-Head HDD

Figure 9:
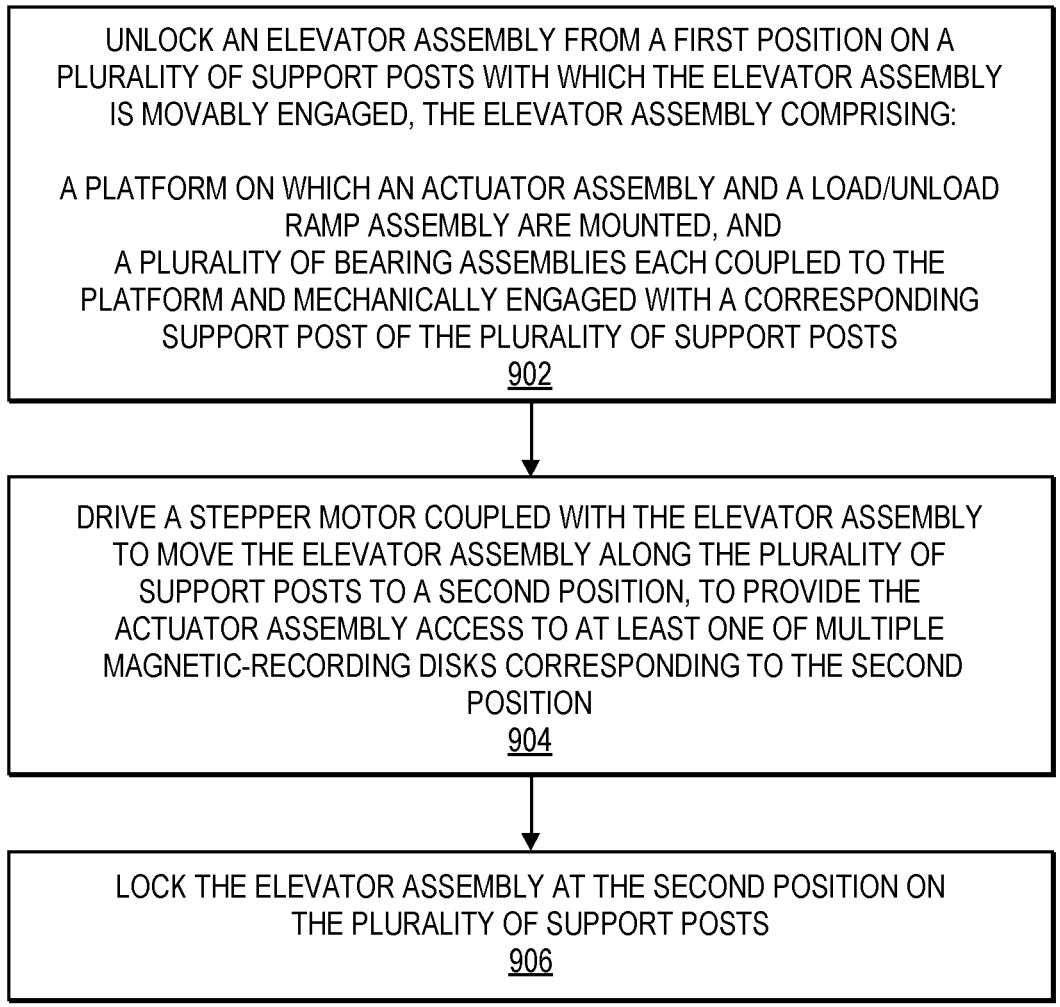
FIG. 9 is a flow diagram illustrating a method of accessing multiple recording disks in a reduced-head hard disk drive, according to an embodiment.

FIG. 9 is a flow diagram illustrating a method of accessing multiple recording disks in a reduced-head hard disk drive, according to an embodiment. That is, the method of FIG. 9 involves accessing a plurality of n recording disks of a disk stack, by a plurality of less than 2n head sliders of a head-stack assembly each comprising a read-write transducer configured to read from and to write to at least two disk media of the disk stack.

At block 902, an elevator assembly is unlocked from a first position on a plurality of support posts with which the elevator assembly is movably engaged, where the elevator assembly comprises (i) a platform on which an actuator assembly and a load/unload ramp assembly are mounted, and (ii) a plurality of bearing assemblies each coupled to the platform and mechanically engaged with a corresponding support post of the plurality of support posts. For example, elevator assembly 200 (FIGS. 2, 8A, 8B), comprising the platform 202, the LUL ramp assembly 206, and the bearing assemblies 208a-208c, is unlocked from a first position along the support posts 802a-802c (FIGS. 8A, 8B) and thus the disk stack, via the clamp 626 (FIG. 6C) of the bearing assembly 208c being activated or deactivated by the piezoelectric actuator 628 (FIG. 6C).

At block 904, a stepper motor that is coupled with the elevator assembly is driven to move the elevator assembly along the plurality of support posts to a second position, to provide the actuator assembly access to at least one of multiple magnetic-recording disks corresponding to the second position. For example, stepper motor 400 (FIGS. 4, 8A, 8B) that is coupled with the elevator assembly 200, via the tab 504a of the VCM plate 500 (FIG. 5) disposed within the coupler 406 of the stepper motor 400, is driven to move the elevator assembly 200 along the plurality of support posts 802a-802c to a second position, to provide the actuator assembly 204 (FIG. 2) access to at least one of multiple magnetic-recording disks 120 (FIGS. 1, 8A, 8B) corresponding to the second position.

At block 906, the elevator assembly is locked at the second position on the plurality of support posts. For example, elevator assembly 200 is locked at the second position along the support posts 802a-802c and thus the disk stack, via the clamp 626 of the bearing assembly 208c being activated or deactivated by the piezoelectric actuator 628. Hence, the actuator assembly 204 housing read-write heads (such as read-write head 110a of FIG. 1) is now enabled to rotate via the VCM from a parked position on the LUL ramp assembly 206 to reading and writing positions in relation to (e.g., "over") one or more disks 120 of a multiple-disk stack.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
   a plurality of recording disk media rotatably mounted on a spindle;
   a plurality of head sliders each comprising a read-write transducer configured to read from and to write to at least two disk media of the plurality of disk media;
   a rotary actuator assembly configured to move the plurality of head sliders to access portions of the at least two disk media, the actuator assembly comprising an actuator arm, a voice coil, and a coil support structure;
   an elevator platform assembly comprising:
      a platform, on which the actuator assembly is mounted, movably engaged with at least one support post, and
      at least one roller bearing assembly coupled to the platform and mechanically engaged with the at least one support post; and
   a motor coupled with the elevator platform assembly and configured to move the elevator platform assembly along the at least one support post to provide the actuator assembly access to each of the plurality of disk media.

2. The HDD of claim 1, wherein the elevator platform assembly further comprises:
   a load/unload (LUL) ramp system coupled to the platform.

3. The HDD of claim 1, wherein the elevator platform assembly further comprises:
   a magnet coupled to the platform and configured to form a voice coil motor in conjunction with the voice coil of the actuator assembly; and
   a voice coil motor plate over the magnet.

4. The HDD of claim 1, wherein the motor comprises a stepper motor and a coupler mechanically coupled with the elevator platform assembly.

5. The HDD of claim 1, wherein:
   the at least one support post comprises at least three support posts on which the elevator platform assembly is movably engaged; and
   the at least one roller bearing assembly comprises at least three roller bearing assemblies coupled to the platform and mechanically engaged with a respective support post of the support posts.

6. The HDD of claim 5, wherein at least one of the bearing assemblies comprises a locking mechanism configured to lock/unlock the elevator platform assembly at multiple positions along the support posts.

7. The HDD of claim 6, wherein the locking mechanism comprises:
   a clamp positioned around a corresponding post of the support posts; and
   a piezoelectric actuator positioned to open the clamp responsive to activation or deactivation of the piezoelectric actuator.

8. The HDD of claim 5, wherein:
   the bearing assemblies are affixed to the platform; and
   at least one of the bearing assemblies is a movable bearing assembly constrained in a direction orthogonal to the platform and movable in a direction in plane with the platform.

9. The HDD of claim 8, further comprising:
   a spring attached to the movable bearing assembly and to the platform to provide a preload to the bearing assemblies.

10. The HDD of claim 1, wherein the elevator platform assembly further comprises:
    a proximity sensor coupled to the platform and positioned for detecting a position of the platform corresponding to each of the plurality of disk media.

11. A method of accessing multiple magnetic-recording disks in a reduced-head hard disk drive, the method comprising:

unlocking an elevator assembly from a first position on a plurality of support posts with which the elevator assembly is movably engaged, the elevator assembly comprising:
- a platform on which an actuator assembly and a load/unload ramp assembly are mounted, and
- a plurality of roller bearing assemblies each coupled to the platform and mechanically engaged with a corresponding support post of the plurality of support posts;

driving a motor coupled with the elevator assembly to move the elevator assembly along the plurality of support posts to a second position, to provide the actuator assembly access to at least one of the multiple magnetic-recording disks corresponding to the second position; and locking the elevator assembly at the second position on the plurality of support posts.

12. The method of claim 11, wherein the elevator assembly further comprises:
- a magnet coupled to the platform and configured to form a voice coil motor in conjunction with a voice coil of the actuator assembly; and
- a voice coil motor plate over the magnet.

13. The method of claim 11, wherein unlocking the elevator assembly includes:
- unlocking the elevator assembly from the first position on at least three support posts with which a corresponding bearing assembly is mechanically engaged.

14. The method of claim 11, wherein unlocking the elevator assembly includes:
- unlocking at least one of the bearing assemblies comprising a locking mechanism configured to lock/unlock the elevator assembly at multiple positions along the support posts.

15. The method of claim 11, wherein:
- each of the plurality of bearing assemblies is affixed to the platform; and
- unlocking the elevator assembly includes unlocking at least one of the bearing assemblies which is a movable bearing assembly constrained in a direction orthogonal to the platform and movable in a direction in plane with the platform.

16. The method of claim 15, wherein the elevator assembly further comprises:
- a spring attached to the movable bearing assembly and to the platform to provide a preload to the plurality of bearing assemblies.

17. The method of claim 15, further comprising:
- while driving the motor and prior to locking the elevator assembly at the second position, sensing a location of a target disk of the multiple magnetic-recording disks.

18. A reduced-head hard disk drive (HDD), comprising:
- recording means for storing digital information;
- reading/writing means for reading from and writing to the recording means;
- means for loading/unloading the reading/writing means to and from a parked position;
- means for moving the reading/writing means to access portions of the recording means;
- means for translating (i) the means for loading/unloading, (ii) the means for moving, and (iii) the reading/writing means from one recording means to another recording means; and
- means for locking the means for translating at the another recording means.

19. The HDD of claim 18, further comprising:
- means for providing a preload to a plurality of bearing means coupled with the means for translating.

20. The HDD of claim 18, further comprising:
- means for detecting a position of the means for translating corresponding to each of the recording means.

\* \* \* \* \*